(12) United States Patent
Hayes, IV et al.

(10) Patent No.: US 9,808,762 B2
(45) Date of Patent: Nov. 7, 2017

(54) PREDICTIVE EMISSIONS MONITOR SYSTEMS AND METHODS

(71) Applicant: ROCKWELL AUTOMATION TECHNOLOGIES, INC., Mayfield Heights, OH (US)

(72) Inventors: Walter Edgar Hayes, IV, Carl Junction, MO (US); Keith Alex Smith, Leander, TX (US); Eugene Boe, Austin, TX (US); Dennis Tzyy-nian Yieh, Houston, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 59 days.

(21) Appl. No.: 14/694,821

(22) Filed: Apr. 23, 2015

(65) Prior Publication Data

US 2016/0310896 A1    Oct. 27, 2016

(51) Int. Cl.
*B01D 53/86* (2006.01)
*B01D 53/92* (2006.01)
*B01D 53/90* (2006.01)

(52) U.S. Cl.
CPC ...... *B01D 53/8696* (2013.01); *B01D 53/8631* (2013.01); *B01D 53/90* (2013.01); *B01D 2251/2062* (2013.01); *B01D 2251/2067* (2013.01); *B01D 2258/0283* (2013.01)

(58) Field of Classification Search
CPC .... B01D 53/34; B01D 53/74; B01D 53/8643; B01D 53/885; B01D 53/92; B01D 53/9431
See application file for complete search history.

(56) References Cited

U.S. PATENT DOCUMENTS

| 2003/0109047 | A1* | 6/2003 | Valentine | ............... B01D 53/79 436/55 |
| 2004/0039514 | A1* | 2/2004 | Steichen | ............... F01N 3/0842 701/109 |
| 2009/0293457 | A1* | 12/2009 | Grichnik | ................. F01N 3/208 60/286 |

* cited by examiner

*Primary Examiner* — Paul Hyun
(74) *Attorney, Agent, or Firm* — Fletcher Yoder P.C.

(57) ABSTRACT

One embodiment of the present disclosure describes an industrial system, which includes a control system with a predictive emissions monitoring system that facilitates determining a chemical level output from a selective catalytic reduction unit that reduces the chemical level in gaseous emissions produced by a combustion source using a selective catalytic reduction model. The control system tunes the selective catalytic reduction model by determining tuning parameters based at least in part on vendor information and tuning data determined via a tuning sequence. The tuning sequence includes operating the combustion source at a plurality of load levels, injecting a reactant into received gaseous emissions at each of the plurality of load levels in accordance with an injection rate provided in the vendor information; and determining an input chemical level to and an output chemical level from the selective catalytic reduction unit at each of the plurality of load levels.

11 Claims, 4 Drawing Sheets

FIG. 6 ured by a gas turbine in a plant may release gaseous emissions that include nitrogen oxide (NOx).

PREDICTIVE EMISSIONS MONITOR SYSTEMS AND METHODS

BACKGROUND

The present disclosure relates generally to emissions monitoring systems and, more particularly, to predictive emissions monitoring systems used with selective catalytic reduction (SCR) units.

In an industrial system, gaseous emissions including various chemicals may be released by a plant, such as a manufacturing plant, a power generating plant, and the like. More specifically, the gaseous emissions may be produced by various combustion sources in the industrial plants, such as boilers, furnaces, gas turbines, thermal oxidizers, heaters, and the like. For example, a gas turbine in a plant may release gaseous emissions that include nitrogen oxide ($NO_x$).

However, regulatory bodies generally set limits on specific levels of chemicals, such as nitrogen oxide, released into the atmosphere. To facilitate compliance, selective catalytic reduction (SCR) units may be used to reduce levels of the specific chemicals within the gaseous emissions. Additionally, an emissions monitoring system may monitor the specific chemical levels in the gaseous emissions released into the atmosphere.

BRIEF DESCRIPTION

Certain embodiments commensurate in scope with the originally claimed embodiments are summarized below. These embodiments are not intended to limit the scope of the claimed invention, but rather these embodiments are intended only to provide a brief summary of possible forms of the systems and techniques described herein. Indeed, the systems and techniques described herein may encompass a variety of forms that may be similar to or different from the embodiments set forth below.

The present disclosure sets forth an industrial system, which includes a control system. The control system includes a predictive emissions monitoring system that facilitates determining a chemical level output from a selective catalytic reduction unit that reduces the chemical level in gaseous emissions produced by a combustion source in the industrial system using a selective catalytic reduction model. The control system tunes the selective catalytic reduction model to the selective catalytic reduction unit by determining tuning parameters of the selective catalytic reduction model based at least in part on vendor information and tuning data determined via a tuning sequence. The tuning sequence includes operating the combustion source at a plurality of load levels, injecting, using the selective catalytic reduction unit, a reactant into received gaseous emissions at each of the plurality of load levels in accordance with an injection rate provided in the vendor information; and determining an input chemical level to and an output chemical level from the selective catalytic reduction unit at each of the plurality of load levels.

The present disclosure also sets forth a method for utilizing a selective catalytic reduction model, which includes tuning the selective catalytic reduction model to a selective catalytic reduction unit that processes nitrogen oxide produced by a combustion source. Tuning the selective catalytic reduction model includes instructing the combustion source to operate at a plurality of load levels; determining an input nitrogen oxide level to the selective catalytic reduction unit at each of the plurality of load levels; determining an injection rate of ammonia in the selective catalytic reduction unit at each of the plurality of load levels; determining an output nitrogen oxide level from the selective catalytic reduction unit at each of the plurality of load levels; and determining tuning parameters of the selective catalytic reduction model based at least in part on the input nitrogen oxide level, the output nitrogen oxide level, and the injection rate of ammonia determined at each of the plurality of load levels; and controlling, using a control system, operation of the selective catalytic reduction unit based at least in part on amount of nitrogen oxide released from the selective catalytic reduction unit determined using the selective catalytic reduction model.

The present disclosure further sets forth a tangible, non-transitory, computer-readable medium that stores instructions executable by a processor of a control system. The instructions include instructions to instruct, using the processor, a combustion source to operate at a first load; instruct, using the processor, a selective catalytic reduction unit to inject ammonia at a first injection rate into gaseous emissions produced by the combustion source when operating at the first load; determine, using the processor, a first set of operational parameters of the selective catalytic reduction unit associated with the combustion source operating at the first load; instruct, using the processor, the combustion source to increase from the first load to a second load; instruct, using the processor, the selective catalytic reduction unit to inject ammonia at a second injection rate into gaseous emissions produced by the combustion source when operating at the second load; determine, using the processor, a second set of operational parameters of the selective catalytic reduction unit associated with the combustion source operating at the second load; and determine, using the processor, a selective catalytic reduction model configured to facilitate determining nitrogen oxide levels output from the selective catalytic reduction unit based at least in part on the first injection rate, the first set of operational parameters, the second injection rate, and the second set of operational parameters.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As discussed above, a combustion source in a plant may produce gaseous emissions that include various chemicals. Since limits may be set on allowable levels of specific chemicals released into the atmosphere, operation of the plant may be controlled to maintain those chemical levels within the set limits. In some embodiment, a selective catalytic reduction (SCR) unit may be operated to produce a chemical reaction that reduces a specific chemical level. More specifically, the selective catalytic reduction unit may inject a reactant into the gaseous emissions and flow the mixture onto a catalyst to produce the chemical reaction. For example, when ammonia ($NH_3$) is injected, a chemical reaction between nitrogen oxide in gaseous emissions and the ammonia may produce nitrogen gas ($N_2$) and water ($H_2O$), thereby reducing the level of nitrogen oxide in the gaseous emissions.

Additionally, an emissions monitoring system may be used to monitor chemical levels in the gaseous emissions released into the atmosphere. In some embodiments, one or more hardware sensors may be utilized to directly measure the chemicals levels. However, since hardware sensors may be costly to purchase, install, and maintain, in other embodiments, a predictive emissions monitoring system (PEMS) may be used to determine the chemicals levels released based at least in part on operational parameters of the selective catalytic reduction unit. More specifically, the predictive emissions monitoring system may include a model that describes a relationship between the operational parameters and the released chemical level defined by characteristics of the selective catalytic reduction unit.

Thus, the model may be tuned to the selective catalytic reduction unit before using the predictive emissions monitoring system. In some embodiments, it may be possible to tune the model using a purely empirical approach. More specifically, such an approach may include incrementally increasing load of the combustion source from 0-100% (e.g., 10%, 20%, 30%, and so on). Additionally, at each load, the reactant injection rate may be incrementally increased from 0-100% (e.g., 10%, 20%, 30%, and so on). Thus, by measuring the input and output chemical levels at each load, the model may be tuned to the selective catalytic reduction unit.

However, tuning the model using a purely empirical approach may increase the cost of implementing the emissions monitoring system. More specifically, the duration of the tuning process may be increased because the model is tuned by operating the combustion source and the selective catalytic reduction unit through their entire operating ranges. Additionally, at a specific load, the released chemical levels may end up being higher than set limits when the reactant injection rate is low. On the other hand, when the reactant injection rate is increased above a threshold, the released chemical levels may remain at effectively zero and, thus, not provide insightful tuning data. Moreover, elevated levels of reactant may actually affect life span of the selective catalytic reduction unit and/or cause released levels of the reactant to be above a set limit.

Accordingly, as will be described in more detail below, the present disclosure provides techniques to improve implementation of an emissions monitoring system by leveraging vendor (e.g., manufacturer) provided information. More specifically, in some embodiments, the vendor may design a selective catalytic reduction unit such that the reactant injection rate should reduce chemical level by a specific percentage when operated within a range of operational parameters. For example, the selective catalytic reduction unit may be designed to control injection rate of ammonia ($NH_3$) injection rate so that nitrogen oxide ($NO_x$) levels should be reduced by 80% when temperature of the catalyst is between 400-800° F. Generally, the reactant injection rate is based on the load of the combustion source. In other words, based on vendor information, the reactant injection rate at various combustion source loads and the chemical level reduction rate at various reactant injection rates may be determined.

Although the reduction rate provided by the vendor is generally accurate, additional accuracy may be provided via a predictive emissions monitoring system. More specifically, the reduction rate may also be affected by operational parameters other than reactant injection rate, such as catalyst efficiency. As such, a model used in the predictive emissions monitoring system may determine the output chemical level based on various operational parameters, such as input chemical level, reactant injection rate, catalyst efficiency, catalyst temperature, and catalyst pressure. Nevertheless, since the reactant injection rate is generally based on the load of the combustion source, the vendor information may be utilized to facilitate improving the tuning process for the model. In other words, based on vendor information, the reactant injection rate at various combustion source loads may be determined.

As such, in some embodiments, the model may be tuned by incrementally increasing load of the combustion source from 0-100%. In fact, since the reactant injection rate at each load is provided by the vendor, varying the injection rate at each load may be obviated. Thus, the model may be tuned by determining tuning parameters of the model based at least in part on the measured the input and output chemical levels from the selective catalytic reduction unit during the tuning process. In fact, obviating the reactant injection rate adjustments at each combustion source load may reduce duration of the tuning process, periods of exceeding emissions limits, and/or operating costs associated with the tuning process.

Figure 1:
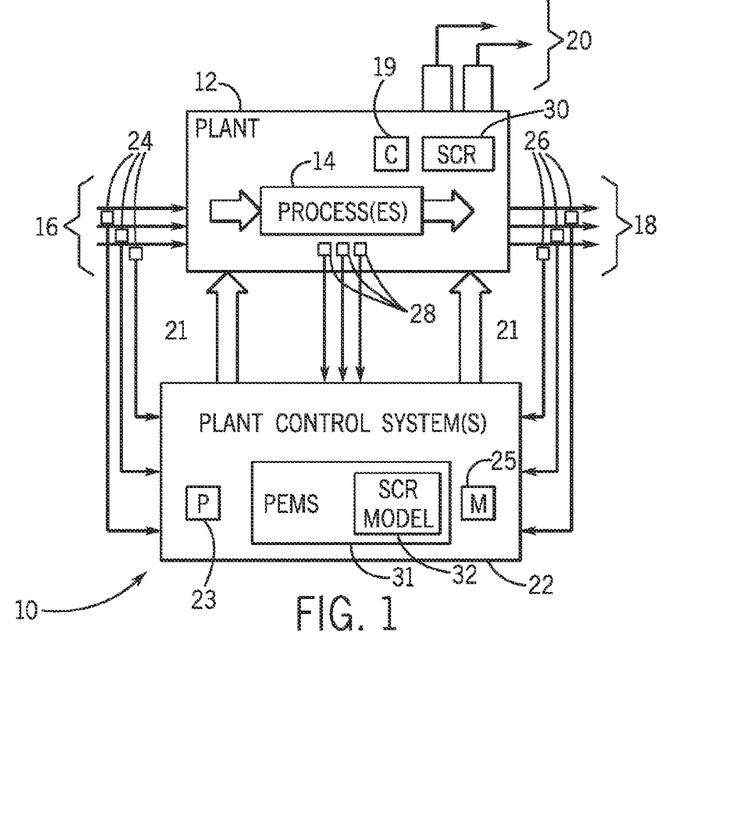
FIG. 1 is a schematic diagram of an industrial system that produces gaseous emissions, in accordance with an exemplary embodiment of the present techniques.

To help illustrate, an industrial system 10 including a plant 12 that produces gaseous emissions is described in FIG. 1. In some embodiments, the plant 12 may be any desired factory, vehicle, installation, or the like. More specifically, the plant 12 may include one or more processes 14 to convert or transform one or more inputs 16, such as raw or semi-raw materials, into one or more desired outputs 18, such as manufactured goods, energy, by-products, or waste products. Thus, in some embodiments, the process 14 may include a combustion process, a chemical reaction process, an assembly processes, a molding process, a material handling processes, or any combination thereof.

To facilitate performing the process 14, the plant 12 may include various components. For example, the plant 12 may include one or more combustion sources 19 to provide mechanical energy and/or heat energy to the process 14. In some embodiments, the combustion sources 19 may include boilers, furnaces, gas turbines, thermal oxidizers, heaters, or any combination thereof. However, such combustions sources 19 may produce gaseous emissions 20, which may include various chemicals either as gasses or gas-borne particulates.

Additionally, the industrial system 10 may include a plant control system 22 to control operation of the plant 12. More specifically, the plant control system 22 may transmit control signals 21 to the plant 14 to instruct components in plant 14. For example, the plant control system 22 may transmit a control signal 21 instructing the one or more combustion sources 19 to adjust operation load. As such, the plant control system 22 may include a processor 21 and memory 23. In some embodiments, the processor 21 may include one or more general purpose microprocessors, one or more application specific processors (ASICs), one or more field programmable logic arrays (FPGAs), or any combination thereof. Additionally, the memory 23 may be a tangible, non-transitory, computer-readable medium that stores instructions executable by and data to be processed by the processor 21. For example, the memory 23 may include random access memory (RAM), read only memory (ROM), rewritable flash memory, hard drives, optical discs, and the like.

To facilitate controlling the process 14, the plant control systems 22 may also receive sensor measurements from various sensors in the plant 12. For example, the plant control system 22 may receive measurements from input sensors 24 regarding operational parameters of the inputs 16 and measurements from output sensors 25 regarding operational parameters of the outputs 18. In some embodiments, the input sensors 24 and the output sensors 26 may measure operational parameters including temperature, pressure, flow rates, power inputs, and so forth. Additionally, the plant control system 22 may receive measurements from process sensors 28 regarding operational parameters of intermediate products in the process 14 and/or operational parameters of components in the plant 12. For example, the process sensors 28 may measure chemical levels in gaseous emissions produced by a combustion source 19 and/or load of a combustion source 19.

As described above, regulatory bodies may place limits on chemical levels released into the atmosphere. Accordingly, the plant 12 may include one or more selective catalytic reduction (SCR) units 30 used to reduce chemicals levels in gaseous emissions produced by the combustion source 19. Additionally, as will be described in more detail below, the plant control system 22 may include a predictive emissions system 31 that determines chemical level in gaseous emissions output from the selective catalytic reduction unit 30 using a selective catalytic reduction model 32.

Figure 2:
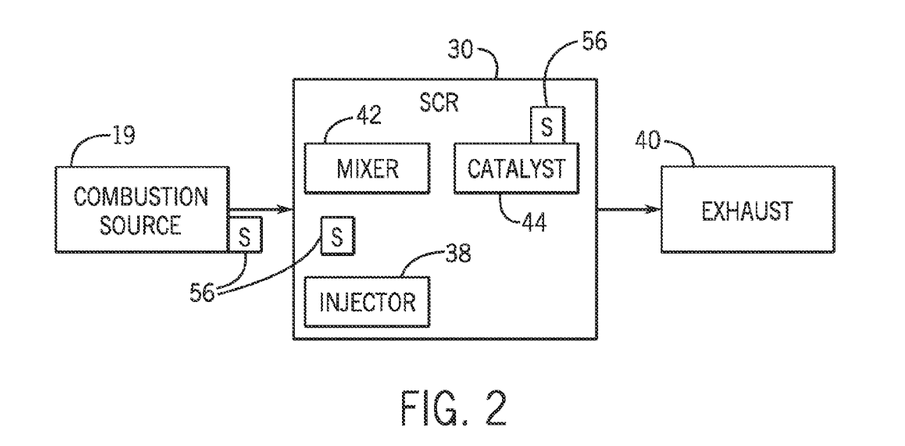
FIG. 2 is a block diagram of a selective catalytic reduction (SCR) unit used in the industrial system of FIG. 1.

To help illustrate, a more detailed view of a selective catalytic reduction (SCR) unit 30 fluidly coupled to a combustion source 19 and an exhaust pipe 40 is described in FIG. 2. More specifically, in the depicted embodiment, the selective catalytic reduction unit 30 includes an injector 38, a mixer 42 and a catalyst 44.

In operation, the selective catalytic reduction unit 30 receives gaseous emissions produced by the combustion source 19 and directs the gaseous emissions into the mixer 42. In the mixer 42, the injector 38 sprays reactant into the gaseous emissions to facilitate reducing one or more chemical levels. For example, the injector 38 may spray ammonia ($NH_3$) and/or urea into the gaseous emissions to reduce nitrogen oxide ($NO_x$) level. The mixer 42 may then supply a well-mixed emissions solution (e.g., a mixture of the gaseous emissions and reactant) to the catalyst 44.

The catalyst 44 may then facilitates a chemical reaction between chemicals in the gaseous emissions and the reactant. For example, the catalyst 44 may be a base metal or zeolite to facilitate a chemical reaction between ammonia and nitrogen oxide that produces nitrogen gas ($N_2$) and water ($H_2O$). In fact, the ability of the selective catalytic reduction unit 30 to reduce chemical levels may be based on operational parameters of the catalyst 44, such as temperature of the catalyst 44, pressure of the catalyst 44, and efficiency of the catalyst 44. Thus, as will be described in more detail below, such operational parameters may be determined and used in the selective catalytic reduction model 32 to determine an output chemical level released from the selective catalytic reduction unit 30. Finally, the selective catalytic reduction unit 30 may send the processed gaseous emissions with a reduced chemical level through the exhaust pipe 40 and into the atmosphere.

As described above, it may be desirable to monitor chemical levels released into the atmosphere. In some embodiments, the plant control system 22 may use the predictive emissions monitoring system 31 to determine output chemical levels by inputting operational parameters of the selective catalytic reduction unit 30 into a selective catalytic reduction model 32.

Figure 3:
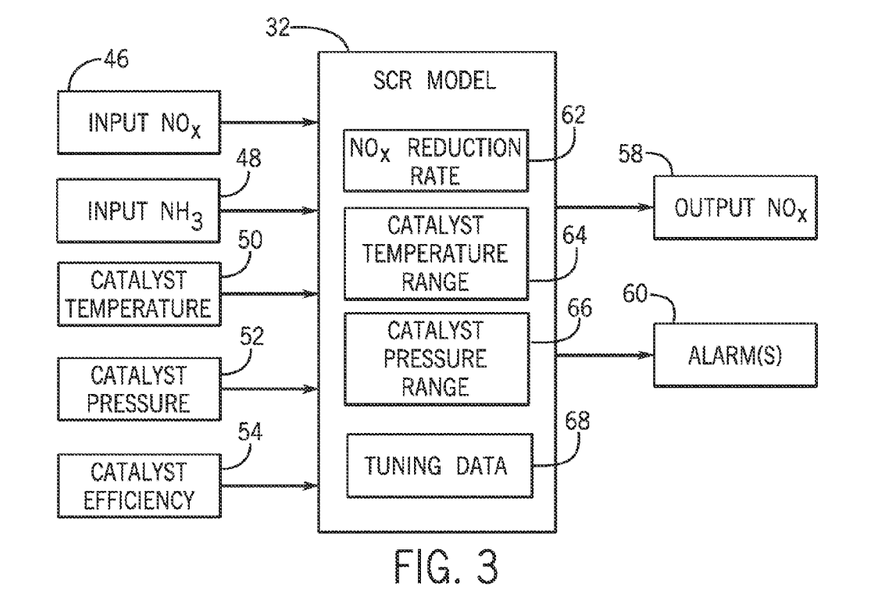
FIG. 3 is a block diagram of model of the SCR unit of FIG. 2.

To help illustrate, one embodiment of a selective catalytic reduction model 32 is described in FIG. 3. In the depicted embodiment, the selective catalytic reduction model 32 receives operational parameters that include input nitrogen oxide ($NO_x$) level 46, ammonia ($NH_3$) injection rate 48, catalyst temperature 50, catalyst pressure 52, and catalyst efficiency 54. In some embodiments, the operational parameters may be determined by one or more process sensors 28 in the selective catalytic reduction unit 30.

Based on the operational parameters, the selective catalytic reduction model 32 may be used to determine the output nitrogen oxide ($NO_x$) level 58 and one or more alarms 60, which may indicate when the selective catalytic reduction unit 30 is operating outside of desired ranges. More specifically, to enable determining the output nitrogen oxide level 58, the selective catalytic reduction model 32 may be tuned to the selective catalytic reduction unit 30 based at least in part on tuning data 68 and characteristics of the selective catalytic reduction unit 30, which may include a nitrogen oxide ($NO_x$) reduction rate 62, a catalyst temperature range 64, and a catalyst pressure range 66.

Figure 4:
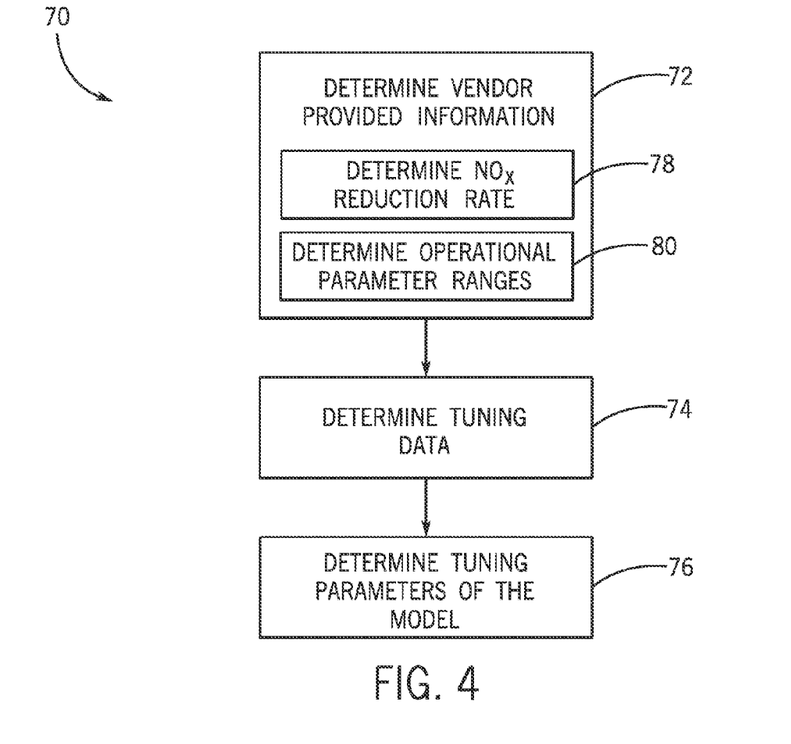
FIG. 4 is a flow diagram describing a process for determining the SCR model of FIG. 3.

One embodiment of a process 70 for tuning a selective catalytic reduction model 32 is described in FIG. 4. Generally, the process 70 includes determining vendor provided information (process block 72), determining tuning data (process block 74), and determining tuning parameters of the model (process block 76). In some embodiments, the process 70 may be implemented using instructions stored in memory 25 and/or another suitable tangible, non-transitory, computer-readable medium that are executable by processor 23 and/or another suitable processing circuitry.

Accordingly, the plant control system 22 may determine the vendor provide information (process block 72), which may include determining the nitrogen oxide ($NO_x$) reduction rate provided by the vendor (process block 78) and determining operational parameter ranges within which the nitrogen oxide reduction rate is specified by the vendor (process block 80). As described above, the vendor may design a selective catalytic reduction unit 30 to adjust ammonia injection rate based combustion source load to achieve a specified nitrogen oxide reduction rate. Additionally, the vendor may design the selective catalytic reduction unit 30 such that the nitrogen oxide reduction rate should be achieved when within specific operational parameter ranges. For example, the vendor may provide that the selective catalytic reduction unit 30 should have an 80% reduction rate when the catalyst 44 is between 400-800° F. and between 10-100 psi.

In some embodiments, the vendor may store the vendor provided information (e.g., nitrogen oxide reduction rate and/or operational parameter ranges) in memory 25 upon commissioning of the selective catalytic reduction unit 30. Additionally or alternatively, the vendor provided information may be manually input from documentation provided by the vendor into the plant control system 22 and stored in memory 25. Thus, upon beginning the tuning process, the plant control system 22 may poll the memory 25 to determine the vendor provided information.

The plant control system 22 may then determine tuning data 68 (process block 74). More specifically, the tuning data 68 may include operational parameters of the selective catalytic reduction unit 30 when a tuning sequence is run. In some embodiments, operational parameters that describe characteristics of components in the selective catalytic reduction unit 30 may be determined through testing. For example, the catalyst efficiency may be determined by sampling a portion of the catalyst 44 and testing the sampled portion. Additionally, the operational parameters that describe operation of the selective catalytic reduction unit 30 may be determined by running the tuning sequence.

Figure 5:
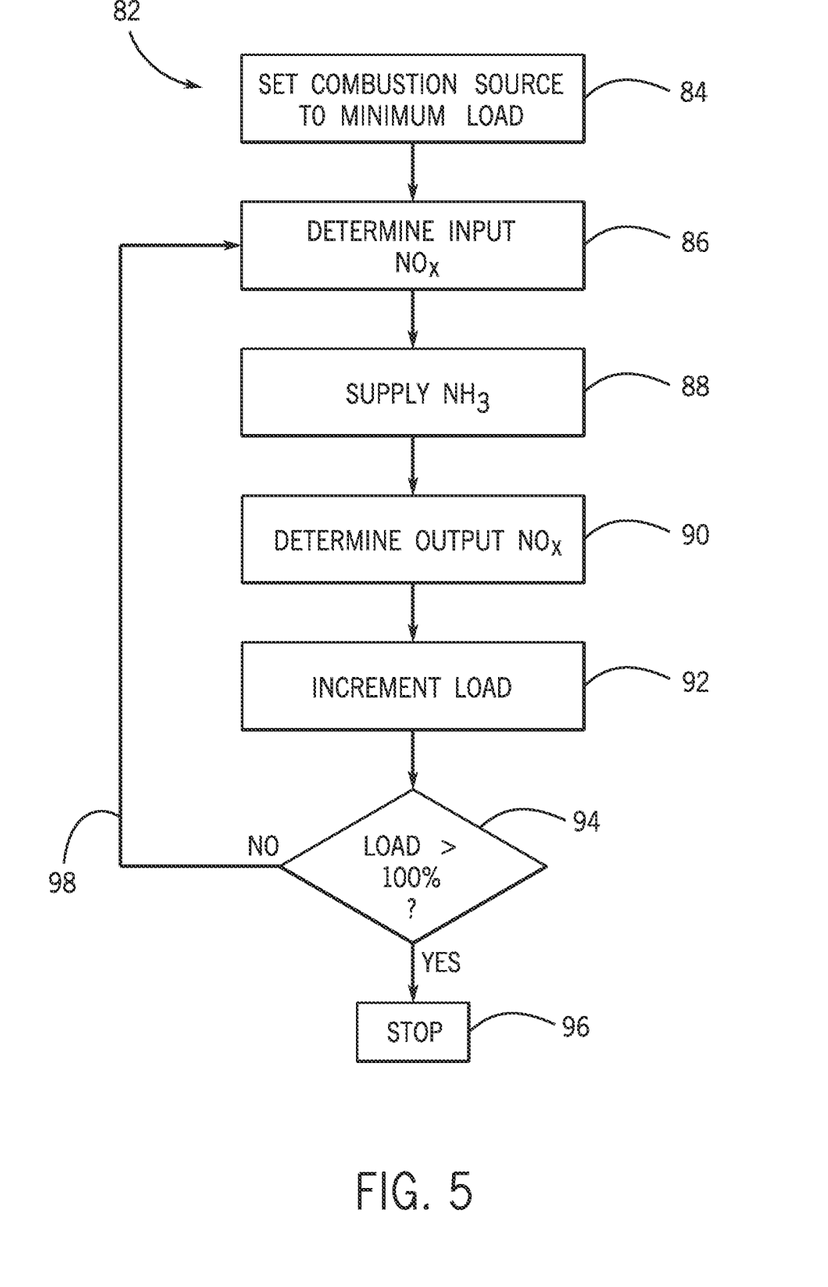
FIG. 5 is a flow diagram describing a process for determining tuning data.

To help illustrate, an embodiment of a process 82 for determining tuning data 68 when running a tuning sequence is described in FIG. 5. Generally, the process 82 includes setting a combustion source to a minimum load (process block 84), determining input nitrogen oxide ($NO_x$) level (process block 86), supplying ammonia ($NH_3$) (process block 88), determining output nitrogen oxide ($NO_x$) level (process block 90), incrementing load of the combustion source (process block 92), determining when the load is greater than 100% (decision block 94), stopping the process 82 when the load is greater than 100% (process block 96), and returning to process block 86 when the load is not greater than 100% (arrow 98). In some embodiments, the process 82 may be implemented using instructions stored in memory 25 and/or another suitable tangible, non-transitory, computer-readable medium that are executable by processor 23 and/or another suitable processing circuitry.

Accordingly, the plant control system 22 may set the combustion source 19 to a minimum load (process block 84). In some embodiments, the plant control system 22 may instruct the combustion source 19 to operate at 10% load via a control signal 21. The plant control system 22 may then determine the nitrogen oxide level in gaseous emissions input to the selective catalytic reduction unit 30 from the combustion source 19 (process block 86). In some embodiments, the input nitrogen oxide level may be determined by one or more process sensors 28 coupled between the combustion source 19 and the selective catalytic reduction unit 30.

Once the gaseous emissions are input, the selective catalytic reduction unit 30 may inject ammonia to create a chemical reaction between the ammonia and nitrogen oxide in the gaseous emissions (process block 88). As described above, the injection rate of the ammonia may be predetermined by the vendor based on the combustion source load. As such, the input ammonia may be determined based at least in part on the vendor provided information.

The plant control system 22 may then determine the nitrogen oxide ($NO_x$) output from the selective catalytic reduction unit 30 (process block 90). In some embodiments, one or more temporary sensors may be used. For example, a temporary sensor may be attached to the exhaust 40 to measure the output nitrogen oxide level. In addition to input nitrogen oxide, ammonia injection rate, and output nitrogen oxide, the plant control system 22 may also determine other operational parameters, such as catalyst temperature and catalyst pressure. In some embodiments, the plant control system 22 may utilize the catalyst temperature and the catalyst pressure to determine whether the selective catalytic reduction unit 30 is operating within desired ranges specified by the vendor.

After determining the output nitrogen oxide level, the plant control system 22 may instruct the combustion source 19 to increment the load level (process block 92). In some embodiments, the plant control system 22 may instruct the combustion source 19 to increase load by 10% load via a control signal 21. The plant control system 22 may then determine whether the incremented load is greater than 100% (process block 94) and, when greater than 100%, may stop the tuning process (process block 96).

On the other hand, when the load is not greater than 100%, the plant control system 22 may again determine the input nitrogen oxide level (process block 86), supply ammonia to the gaseous emissions (process block 88), and determine the output nitrogen oxide level (process block 90) associated with the incremented load level. In this manner, the plant control system 22 may determine tuning data 68, which may include catalyst efficiency, catalyst temperature, catalyst pressure, input nitrogen oxide, output nitrogen oxide, ammonia injection rate, or any combination thereof associated with loads between 0-100%, and store the tuning data 68 in memory 25.

Returning to FIG. 4, the plant control system 22 may then determine tuning parameters of the selective catalytic reduction unit model 32 based at least in part on the tuning data 68 and the vendor provided information (process block 76). In some embodiments, the plant control system 22 may determine the tuning data 68 and/or the vendor provided information by polling memory 25. The plant control system 22 may then determine the tuning parameters of the selective catalytic reduction unit model 32 using various techniques. For example, the plant control system 22 may use curve fitting or an optimization problem to determine the tuning parameters such that the selective catalytic reduction unit model 32 reflects the tuning data 68 and the vendor provided information. In this manner, the plant control system 22 may tune the selective catalytic reduction model 32 to the particular the selective catalytic reduce unit 30 being modeled.

Once tuned, the selective catalytic reduction model 32 may be used in the predictive emissions monitoring system 31. More specifically, the selective catalytic reduction model 32 may facilitate determining output nitrogen oxide level 58 from the selective catalytic reduction unit 30 based on operational parameters, such as input nitrogen oxide 46, injection rate of ammonia 48, catalyst temperature 50, catalyst pressure 52, catalyst efficiency 54, or any combination thereof. In addition, the selective catalytic reduction model 32 may facilitate providing alarms 60 to indicate with the selective catalytic reduction unit 30 is operating outside of a desired range.

Figure 6:
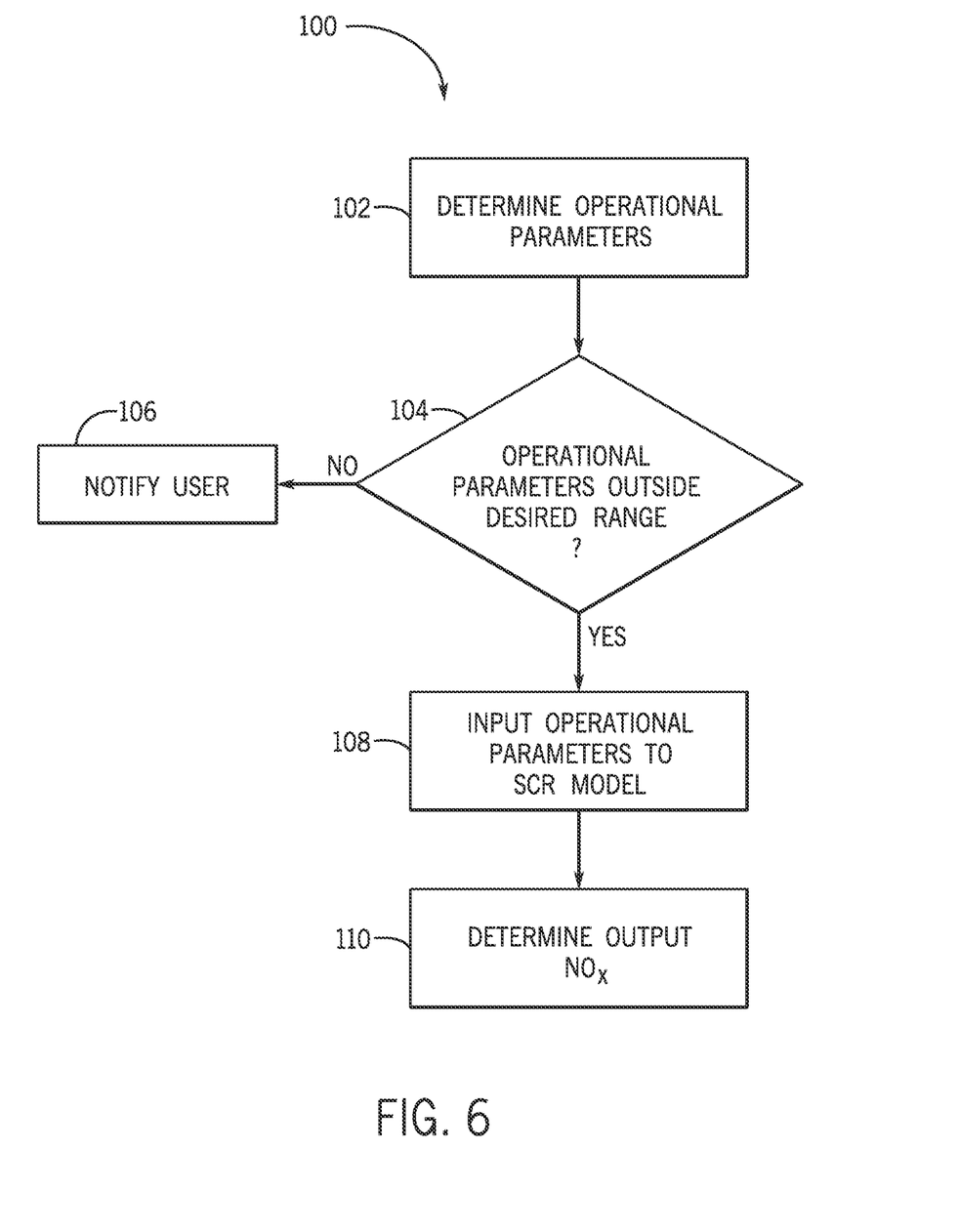
FIG. 6 is a flow diagram describing a process for operating the SCR model of FIG. 3.

To help illustrate, one embodiment of a process 100 for operating a predictive emissions monitoring system 31 is described in FIG. 6. Generally, the process 100 includes determining operational parameters (process block 102), determining whether the operational parameters are outside of desired ranges (process block 104), and notifying a user when the operational parameters are outside of the desired ranges (process block 106). When the operational parameters are not outside of the desired ranges, the process 100 includes inputting the operational parameters to the selective catalytic reduction model (process block 108) and determining output nitrogen oxide level (process block 110). In some embodiments, the process 100 may be implemented using instructions stored in memory 25 and/or another suitable tangible, non-transitory, computer-readable medium that are executable by processor 23 and/or another suitable processing circuitry.

As such, the plant control system 22 may determine operational parameters of the selective catalytic reduction unit 30 (process block 102). In some embodiments, the plant control system 22 may determine input nitrogen oxide 46 generated by a combustion source 19, ammonia injection rate 48 by the selective catalytic reduction unit 30, catalyst temperature 50, and catalyst pressure 52 using one or more process sensors 28. Additionally or alternatively, the plant control system 22 may determine the ammonia injection rate 48, which is related to load of the combustion source 19, based on vendor provided information. Furthermore, other operational parameters that change very gradually over time, such as catalyst efficiency 54, may be periodically determined, for example by sampling and testing the catalyst 44.

The plant control system 22 may then compare the one or more of the determined operational parameters to desired ranges (process block 104). In some embodiments, the desired ranges may be specified by the vendor. For example, the vendor may specify a range of catalyst temperatures and/or a range of catalyst pressures under which the selective catalytic reduction unit 30 is designed to achieve the specified reduction rate. In other words, when one or more of the operational parameters is outside of the desired ranges, the selective catalytic reduction unit 30 may not operate as expected, thereby reducing accuracy of the selective catalytic reduction model 32.

As such, when one or more of the operational parameters is outside of the desired ranges, the plant control system 22 may notify a user accordingly (process block 106). In some embodiments, the plant control system 22 may notify the user using an alarm 60, such as an auditory alarm (e.g., siren), a visual alarm (e.g., blinking lights), or both. Moreover, the plant control system 22 may cease determining the output nitrogen oxide 58 using the selective catalytic reduction model 32.

On the other hand, when each of the operational parameters is not outside of the desired ranges, the plant control system 22 may input the operational parameters into the selective catalytic reduction model 32 (process block 108). Based on the operational parameters, the selective catalytic reduction model 32 may be used to determine the output nitrogen oxide level 58. In this manner, the plant control system 22 may control operation of the plant 12 and/or the process 14 to maintain the output nitrogen oxide level 58 below set regulations, for example, by reducing load of the combustion source 19 and/or increasing ammonia injection rate.

Thus, by utilizing the predictive emissions monitoring system 31, cost associated with determining the output nitrogen oxide level 58 may be reduced, for example, by obviating sensors connected to the exhaust 40. Moreover, since the operation of the combustion source 19 and/or the selective catalytic reduction unit 30 may gradually change over time, the selective catalytic reduction model 32 may be periodically retuned, thereby improving accuracy of the predictive emissions monitoring system 31.

Accordingly, the present disclosure provides technical effects that include improving the tuning of a selective catalytic reduction model used in a predictive emissions monitoring system. More specifically, the tuning of the selective catalytic reduction model may be based at least in part on vendor information, such as a reactant injection rate and/or a chemical level reduction rate. In this manner, adjustments to the reactant injection rate at various load levels during a tuning process may be obviated, thereby reducing duration of the tuning process, reducing period of exceeding emissions limits, reducing costs associated with the tuning process, or any combination thereof.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method for operating a selective catalytic reduction unit, comprising:
   tuning, using a control system, a selective catalytic reduction model to the selective catalytic reduction unit to describe expected relationship between operational parameters of the selective catalytic reduction unit and level of nitrogen oxide output from the selective catalytic reduction unit, wherein tuning the selective catalytic reduction model comprises:
   instructing a combustion source that produces gaseous emissions comprising nitrogen oxide to operate at each of a plurality of load levels;
   instructing the selective catalytic reduction unit to inject a reactant into the gaseous emissions output from the combustion source while operating at each of the plurality of load levels in accordance with an injection rate provided in vendor information;
   determining an input nitrogen oxide level to and an output nitrogen oxide level from the selective catalytic reduction unit at each of the plurality of load levels; and
   determining tuning parameters of the selective catalytic reduction model based at least in part on the input nitrogen oxide level, the output nitrogen oxide level, and the injection rate of the reactant at each of the plurality of load levels; and
   after tuning the selective catalytic reduction model to the selective catalytic reduction unit:
   predicting, using the control system, the level of nitrogen oxide expected to be output from the selective catalytic reduction unit based at least in part on the operational parameters of the selective catalytic reduction unit and the selective catalytic reduction model; and
   controlling, using the control system, operation of the selective catalytic reduction unit based at least in part on the level of nitrogen oxide expected to be output from the selective catalytic reduction unit;
   wherein tuning the selective catalytic reduction model comprises removing a sensor used to determine the output nitrogen oxide level at each of the plurality of load levels after determining the tuning parameters of the selective catalytic reduction model.

2. The method of claim 1, wherein the vendor information indicates:

a constant injection rate of the reactant based on load level of the combustion source;

operational parameter ranges in which the selective catalytic reduction unit is expected to operate; and a nitrogen oxide reduction rate expected to occur when the selective catalytic reduction unit injects the reactant using the constant injection rate and operates within the operational parameter ranges.

3. The method of claim 1, wherein:

determining the input nitrogen oxide level at each of the plurality of load levels comprises polling a first sensor coupled between the combustion source and the selective catalytic reduction unit; and determining the output nitrogen oxide level at each of the plurality of load levels comprises polling a second sensor coupled to an exhaust of the selective catalytic reduction unit, wherein the second sensor is a temporary sensor.

4. The method of claim 1, wherein instructing the combustion source to operate at the plurality of load levels comprises instructing the combustion source to operate at a first load level and, subsequently, instructing the combustion source to operate at a second load level different from the first load level.

5. The method of claim 1, wherein controlling operation of the selective catalytic reduction unit comprises instructing the selective catalytic reduction unit to adjust the injection rate of the reactant into the gaseous emissions received from the combustion source.

6. The method of claim 1, wherein predicting the level of nitrogen oxide expected to be output from the selective catalytic reduction unit comprises:

determining the operational parameters of the selective catalytic reduction unit; and inputting the operational parameters into the selective catalytic reduction model after the tuning parameters are determined.

7. The method of claim 1, wherein the reactant comprises ammonia or urea.

8. A method for utilizing a selective catalytic reduction model, comprising:

tuning the selective catalytic reduction model to a selective catalytic reduction unit configured to process nitrogen oxide produced by a combustion source, wherein tuning the selective catalytic reduction model comprises:

instructing the combustion source to operate at a plurality of load levels;

determining an input nitrogen oxide level to and an output nitrogen oxide level from the selective catalytic reduction unit at each of the plurality of load levels;

determining an injection rate of a reactant in the selective catalytic reduction unit at each of the plurality of load levels;

determining tuning parameters of the selective catalytic reduction model based at least in part on the input nitrogen oxide level, the output nitrogen oxide level, and the injection rate of the reactant determined at each of the plurality of load levels; and removing a sensor used to determine the output nitrogen oxide level at each of the plurality of load levels after determining the tuning parameters of the selective catalytic reduction model; and controlling, using a control system, operation of the selective catalytic reduction unit based at least in part on amount of nitrogen oxide released from the selective catalytic reduction unit determined using the selective catalytic reduction model.

9. The method of claim 8, wherein instructing the combustion source to operate at the plurality of load levels comprises instructing the combustion source to operate at a first load level and, subsequently, instructing the combustion source to operate at a second load level different from the first load level.

10. The method of claim 8, wherein controlling operation of the selective catalytic reduction unit comprises instructing the selective catalytic reduction unit to adjust the injection rate of the reactant into gaseous emissions received from the combustion source.

11. The method of claim 8, wherein controlling operation of the selective catalytic reduction unit comprises: predicting the level of nitrogen oxide expected to be output from the selective catalytic reduction unit by: determining operational parameters of the selective catalytic reduction unit; and inputting the operational parameters into the selective catalytic reduction model after the tuning parameters are determined; and controlling, using a control system, operation of the selective catalytic reduction unit based the level of nitrogen oxide predicted to be output from the selective catalytic reduction unit.

* * * * *